US012560850B2

(12) United States Patent
Pai et al.

(10) Patent No.: US 12,560,850 B2
(45) Date of Patent: Feb. 24, 2026

(54) LIGHTING STRUCTURE OF ELECTRONIC PAPER DISPLAY

(71) Applicants: Chih-Chiang Pai, Taoyuan (TW); Meng-Kuei Lin, Taoyuan (TW); Chin-An Tsai, Taoyuan (TW); Li-Yeh Yang, Taoyuan (TW); Yi-Jing Huang, Taoyuan (TW); Chih-Jung Tsui, Taoyuan (TW)

(72) Inventors: Chih-Chiang Pai, Taoyuan (TW); Meng-Kuei Lin, Taoyuan (TW); Chin-An Tsai, Taoyuan (TW); Li-Yeh Yang, Taoyuan (TW); Yi-Jing Huang, Taoyuan (TW); Chih-Jung Tsui, Taoyuan (TW)

( * ) Notice: Subject to any disclaimer, the term of this patent is extended or adjusted under 35 U.S.C. 154(b) by 464 days.

(21) Appl. No.: 18/094,140

(22) Filed: Jan. 6, 2023

(65) Prior Publication Data

US 2024/0231171 A1      Jul. 11, 2024

(51) Int. Cl.
*G02F 1/1677* (2019.01)
*G02F 1/167* (2019.01)
(52) U.S. Cl.
CPC ............ *G02F 1/1677* (2019.01); *G02F 1/167* (2013.01)

(58) Field of Classification Search
None
See application file for complete search history.

(56) References Cited

U.S. PATENT DOCUMENTS

2024/0126000 A1 *    4/2024   Tan ...................... G02B 6/0036

* cited by examiner

*Primary Examiner* — Richard H Kim

(57) ABSTRACT

An electronic paper display includes a surface cover plate, a lighting module, a first optical adhesive layer, an electronic paper display module and a second optical adhesive layer. A peripheral area of a bottom surface thereof is provided with a black bezel formed by an opaque or low-light-transmittance material. The bottom surface is disposed with a low-refractive-index transparent resin layer. The lighting module has a light guide plate and multiple point light sources. The point light sources are disposed outside an outer edge of the light guide plate. The lighting module is disposed under the surface cover plate. The first optical adhesive layer glues the surface cover plate and the lighting module. The electronic paper display module is disposed under the lighting module. The second optical adhesive layer glues the lighting module and the light guide plate of the lighting module.

4 Claims, 2 Drawing Sheets

LIGHTING STRUCTURE OF ELECTRONIC PAPER DISPLAY

BACKGROUND

Technical Field

The invention relates to electronic paper displays, particularly to an improved lighting structure of electronic paper display.

Related Art

An electronic paper display has properties of simulating paper, such as flexibility, wide viewable angle, light weight, high definition, high contrast and indoor and outdoor readability, and has an advantage of low power consumption, so it has been widely applied to various electronic devices. An electronic paper display itself is not illuminant and usually needs environment light to a light source to the display. However, in low-light circumstances such as an indoor space, the displaying quality will be seriously affected. As a result, a current electronic paper display is usually provided with a lighting module to provide auxiliary illumination to guarantee the displaying quality.

As shown in FIGS. 1 and 2, a current lighting module 20 includes a light guide plate 21 and one or more lights 22 disposed outside a lateral side edge. The light guide plate 21 can convert the point lights 22 into an area light source to provide even illumination to the electronic paper display 10. The lighting module 20 is sandwiched between a surface cover plate 30 and the electronic paper display 10 and a first optical adhesive layer and a second optical adhesive layer are used to glue the lamination as an integral. A peripheral area of the bottom surface of the surface cover plate 30 is disposed with an opaque black bezel 31 as a decorative bezel for cloaking the marginal circuit. The point lights 22 of the lighting module 20 are under the black bezel 31 and the light guide plate 21 and the black bezel 31 is tightly glued together by the first optical adhesive layer 40. However, the refractive index of the first optical adhesive layer 40 is approximately between 1.47 and 1.51, and the refractive index of the light guide plate 21 (acrylic) is about 1.491. The both are very similar in refractive index, so the light from the point lights 22 emitted into a lateral side of the light guide plate 21 will be partially refracted to the first optical adhesive layer 40 and surface cover plate 30 and will be affected by the black bezel 31 to make the refraction and reflection uneven to cause ghosting on the display near the black bezel 31. This will form a dark or bright light texture SD, which not only affect the appearance but also reduce the viewability of the display. It is an issue to be solved.

SUMMARY

An object of the invention is to provide an improved lighting structure of electronic paper display device, which can eliminate the ghosting of the display near the black bezel to make the illumination of the electronic paper display even and bright.

To accomplish the above object, the invention provides a lighting structure of electronic paper display device, which includes a surface cover plate, a lighting module, a first optical adhesive layer, an electronic paper display module and a second optical adhesive layer. A peripheral area of a bottom surface thereof is provided with a black bezel formed by an opaque or low-light-transmittance material. The bottom surface is disposed with a low-refractive-index transparent resin layer. The lighting module has a light guide plate and multiple point light sources. The point light sources are disposed outside an outer edge of the light guide plate. The lighting module is disposed under the surface cover plate. The first optical adhesive layer glues the surface cover plate and the lighting module. The electronic paper display module is disposed under the lighting module. The second optical adhesive layer glues the lighting module and the light guide plate of the lighting module.

By the low-refractive-index transparent resin layer, a complete reflection effect is formed between the lighting module and the surface cover plate to eliminate the ghosting in the display near the black bezel.

According to the invention, a refractive index of the low-refractive-index transparent resin layer is less than that of the first optical adhesive layer. A refractive index of the low-refractive-index transparent resin layer is less than 1.40.

In an embodiment, the first optical adhesive layer is the same as the low-refractive-index transparent resin layer in refractive index, and the low-refractive-index transparent resin layer has a refractive index less than that of the light guide plate. A refractive index of the low-refractive-index transparent resin layer is less than 1.40.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
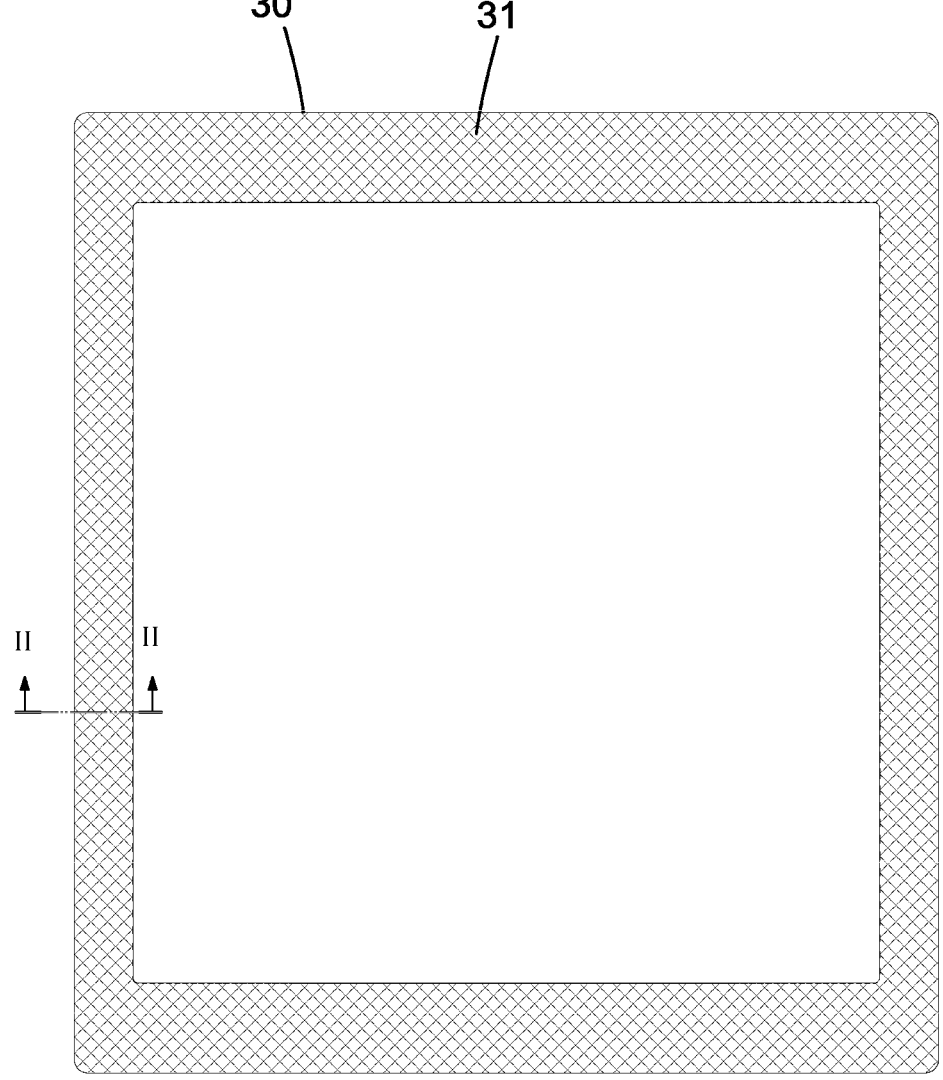
FIG. 1 is a schematic plan view of a conventional electronic paper display.
Figure 2:
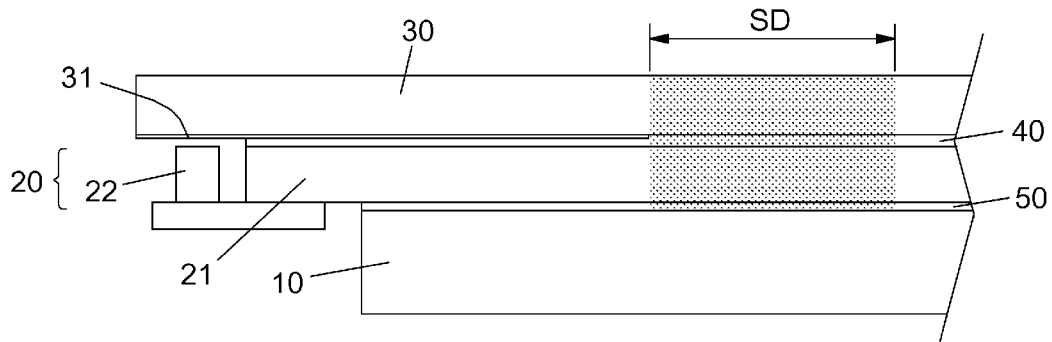
FIG. 2 is a cross-sectional view of the laminative structure along line II-II in FIG. 1.
Figure 3:
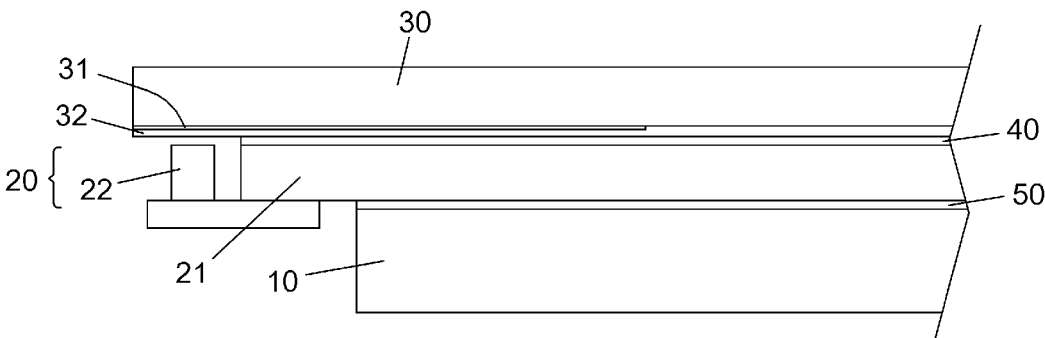
FIG. 3 is a cross-sectional view of the laminative structure of the invention.

FIG. 3 shows a preferred embodiment of the lighting structure of electronic paper display device of the invention, which includes an electronic paper display module 10, a lighting module 20, a surface cover plate 30, a first optical adhesive layer 40, and a second optical adhesive layer 50.

The electronic paper display module 10 is a reflective display which has lower power consumption and flexibility and utilizes the electrophoretic technology or the cholesteric liquid crystal technology to present the image signal onto the display surface of the electronic paper display module 10 as an image.

The lighting module 20 includes a light guide plate 21 and multiple point light sources 22 (such as LEDs or micro-LEDs) disposed outside a side edge of the light guide plate 21. The point light sources 22 emit light from a side edge of the light guide plate 21 and the light is converted into downward area light. The area of the light guide plate 21 matches the viewable area of the electronic paper display module 10 to provide great illumination to the viewable area of the electronic paper display module 10. The light guide plate 21 is made of, but not limited to, polycarbonate (PC), polymethylmethacrylate (PMMA) or polyester (PET). To make the light guide plate 21 form an area light source with even light distribution, the plate body of the light guide plate 21 may be disposed with multiple light diffusing points (not shown) to convert the incident light from the point light sources 22 into light which is evenly distributed on the plate body. The light diffusing points may adopt a material whose refractive index is greater than that of the light guide plate 21 or may be formed by indents or bumps on the plate body of the light guide plate 21. A sparse and dense distribution of the light diffusing points on the light guide plate 21 can also make an effect of even and bright illumination on the light guide plate 21.

The surface cover plate 30 is a thin plate with great mechanic strength and high light transmittance and is made of, but not limited to, various glass, polycarbonate (PC), polymethylmethacrylate (PMMA) and polyester (PET), cyclic olefin copolymer (COC) or cyclic olefin polymer (COP). A peripheral area of a bottom surface of the surface cover plate 30 is provided with a black bezel 31 formed by an opaque or low-light-transmittance film made of a non-conductive material. The non-conductive material may adopt, but not limited to, ink or photoresist. The non-conductive material may use printing, sputtering or coating to form a film with a thickness greater than 15 μm on the peripheral area of the bottom surface. The black bezel 31 of the surface cover plate 30 can cloak the marginal circuit of the point light sources 22 and the electronic paper display module 10 on the periphery of the lighting module 20 to improve the appearance of the overall device. In addition, the bottom surface of the surface cover plate 30 is disposed with a low-refractive-index transparent resin layer 32 whose refractive index is less than 1.40, such as acrylic resin #18204 of NTT-AT® with a refractive index of 1.375.

The first optical adhesive layer 40 and the second optical adhesive layer 50 may be generally available optical transparent adhesive such as the optical clear adhesive (OCA), optical clear resin (OCR) or solid optically clear adhesive (SCA). Usually, the refractive index of each of the first optical adhesive layer 40 and the second optical adhesive layer 50 is approximately between 1.47 and 1.51.

As shown in FIG. 3, the second optical adhesive layer 50 glues the electronic paper display module 10 and the bottom side of the light guide plate 21 of the lighting module 20, and the first optical adhesive layer 40 glues the surface cover plate 30 and the lighting module 20. The low-refractive-index transparent resin layer 32 on the bottom side of the surface cover plate 30 is less than the first optical adhesive layer 40 in refractive index, for example, the refractive index of the low-refractive-index transparent resin layer 32 is 1.375 and the refractive index of the first optical adhesive layer 40 is 1.495, so a complete reflection interface can be formed between the surface cover plate 30 and the lighting module 20. Thus, the light entering from a lateral side of the light guide plate 21 would not affected by the black bezel 31 and the surface cover plate 30 so as to improve the problem of the ghosting on the display near the black bezel 31.

In addition, according to the lighting structure of electronic paper display device of the invention, the refractive index of the first optical adhesive layer 40 may be configured to be the same as the refractive index of the low-refractive-index transparent resin layer 32, and the low-refractive-index transparent resin layer 32 has a refractive index less than that of the light guide plate 21. For example, the refractive index of the low-refractive-index transparent resin layer 32 is 1.375 and the refractive index of the light guide plate 21 (when made of acrylic) is 1.491, so a complete reflection interface can be formed between the surface cover plate 30 and the lighting module 20. Thus, the light entering from a lateral side of the light guide plate 21 would not affected by the black bezel 31 and the surface cover plate 30 so as to improve the problem of the ghosting on the display near the black bezel 31.

While this disclosure has been described by means of specific embodiments, numerous modifications and variations could be made thereto by those skilled in the art without departing from the scope and spirit of this disclosure set forth in the claims.

What is claimed is:

1. An electronic paper display with backlight, comprising:
a surface cover plate, a peripheral area of a bottom surface thereof being provided with a black bezel formed by an opaque or low-light-transmittance material, and the bottom surface being disposed with a low-refractive-index transparent resin layer;
a lighting module, having a light guide plate and multiple point light sources, the point light sources being disposed outside an outer edge of the light guide plate, the lighting module being directly disposed on the bottom surface of the surface cover plate;
a first optical adhesive layer, gluing the surface cover plate with the low-refractive-index transparent resin layer and the lighting module, and sandwiched between the low-refractive-index transparent resin layer and the light guide plate;
an electronic paper display module, directly disposed on a bottom side of the light guide plate of the lighting module; and
a second optical adhesive layer, gluing the electronic paper display module and the bottom side of the light guide plate of the lighting module;
wherein a refractive index of the low-refractive-index transparent resin layer is less than that of the first optical adhesive layer.

2. The electronic paper display with backlight of claim 1, wherein a refractive index of the low-refractive-index transparent resin layer is less than 1.40.

3. The electronic paper display with backlight of claim 1, wherein the first optical adhesive layer is the same as the low-refractive-index transparent resin layer in refractive index, and the low-refractive-index transparent resin layer has a refractive index less than that of the light guide plate.

4. The electronic paper display with backlight of claim 3, wherein a refractive index of the low-refractive-index transparent resin layer is less than 1.40.

* * * * *